(12) United States Patent
Chen

(10) Patent No.: US 6,594,869 B1
(45) Date of Patent: Jul. 22, 2003

(54) TUBE CLAMP

(76) Inventor: Dian-Tai Chen, No. 12, Alley 63, Lane 588, Wenchang Rd., Sec. 2, Yungshun Tsun, Tatu Hsiang, Taichung County (TW)

( * ) Notice: Subject to any disclaimer, the term of this patent is extended or adjusted under 35 U.S.C. 154(b) by 0 days.

(21) Appl. No.: 10/055,984

(22) Filed: Jan. 28, 2002

(51) Int. Cl.⁷ .............................. A44B 21/00; B65D 63/06
(52) U.S. Cl. ...................... 24/274 R; 24/19; 24/16 PB; 24/271; 24/279; 285/114; 285/410
(58) Field of Search ................................ 24/274 R, 278, 24/280, 282, 274 WB, 281, 305, 495, 271, 279, 591.1, 19; 411/41; 285/114, 410, 419

(56) References Cited

U.S. PATENT DOCUMENTS

| ,978,619 | A | * | 12/1910 | Morgan ..................... 24/274 R |
|---|---|---|---|---|
| 1,065,408 | A | * | 6/1913 | Thorsby ....................... 24/279 |
| 1,262,413 | A | * | 4/1918 | Tyler ........................ 24/274 R |
| 1,447,956 | A | * | 3/1923 | Blaise ....................... 24/274 R |
| 1,684,666 | A | * | 9/1928 | Frazier ........................ 24/279 |
| 1,986,748 | A | * | 1/1935 | Pritchard ....................... 24/19 |
| 2,352,971 | A | * | 7/1944 | Prochaska .................... 24/279 |
| 2,579,104 | A | * | 12/1951 | Woolsey et al. .......... 24/274 R |
| 3,737,959 | A | * | 6/1973 | Smith et al. ................... 24/279 |
| 4,526,756 | A | * | 7/1985 | Wong ....................... 24/16 PB |

* cited by examiner

Primary Examiner—Victor Sakran
(74) Attorney, Agent, or Firm—Rosenberg, Klein & Lee

(57) ABSTRACT

A tube clamp is constructed to include a binding strap injection-molded from high strength plastics, the binding strap having two lugs at two ends, and a smoothly arched rib-reinforced extension bearing flange forwardly extended from the first leg and adapted for supporting the second lug and guide movement of the second lug toward the first lug, a screw bolt inserted through a through hole in the first lug and threaded into a screw hole in the second lug and screwed up with a nut to fix the tube clamp to the workpiece.

2 Claims, 7 Drawing Sheets

TUBE CLAMP

BACKGROUND OF THE INVENTION

1. Field of the Invention

The present invention relates to a tube clamp for securing a flexible tubular member, for example, a hose to a rigid tubular member, and more particularly to such a tube clamp, which is inexpensive to manufacture and easy to use.

2. Description of the Related Art

FIGS. 1, 2A, and 2B show a tube clamp according to the prior art. This structure of tube clamp comprises a transversely grooved metal binding strap 1 having an opening 3 at its one end, namely, the lead end, a screw holder 4 fastened to the opening 3 of the binding strap 1 by its integrated clamping plates 5, and a screw 7 mounted in the screw holder 4 and turned to move the tail end of the binding strap 1 over its lead end in tightening up the tube clamp. The screw 7 has threads meshed with transverse grooves 2 of the binding strap 1. The clamping plates 5 have a respective protruded mounting flange 6 fastened to the periphery of the opening 3. This structure of tube clamp is not satisfactory in function. One drawback of this structure of tube clamp is that the clamping plates 5 of the screw holder 4 tend to be forced away from the binding strap 1 when the tube clamp excessively tightened. Another drawback of this structure of tube clamp is that the formation of the transverse grooves 2 of the binding strap 1 weakens the structural strength of the binding strap 1. Still another drawback of this structure of tube clamp is that the screw 7 tends to be disengaged from the transverse grooves 2 of the binding strap 1 when the tube clamp excessively tightened.

FIGS. 3 and 4 show another structure of tube clamp according to the prior art. According to this design, the tube clamp comprises a metal binding strap 10, the metal binding strap 10 having two end scrolls 11 at the ends thereof, each scroll 11 having the free end H welded to the outer surface of the metal binding strap 10 and two holes 12 aligned at two sides, two metal reinforcing barrels 13 respectively inserted into the scrolls 11, each metal reinforcing barrel 13 having two through holes 130 in alignment with the holes 12 of the corresponding scroll 11, a smoothly arched metal reinforcing plate 16 attached to the scrolls 11 at the inner side, the metal reinforcing plate 16 having two locating flanges 160 respectively stopped at two sides of the scrolls 11, a screw bolt 14 inserted through the holes 12 of the scrolls 11 and the holes 130 of the metal reinforcing barrels 13, and a nut 15 threaded onto the screw bolt 14. This structure of tube clamp still has numerous drawbacks. One drawback of this structure of tube clamp is its complicated fabrication process. Another drawback of this structure of tube clamp is its high manufacturing cost. Still another drawback of this structure of tube clamp is its complicated installation procedure. Furthermore, because the parts of the aforesaid two prior art designs are made of metal, they are heavy and may injure the skin when touched. When exposed to the weather, the metal parts will be covered with rust soon.

SUMMARY OF THE INVENTION

The present invention has been accomplished to provide a tube clamp, which eliminates the aforesaid drawbacks. It is one object of the present invention to provide a tube clamp, which is durable in use. It is another object of the present invention to provide a tube clamp, which is inexpensive to manufacture. According to one embodiment of the present invention, the tube clamp comprises a binding strap injection-molded from high strength plastics, the binding strap having two lugs at two ends, and a smoothly arched rib-reinforced extension bearing flange forwardly extended from the first leg and adapted for supporting the second lug and guide movement of the second lug toward the first lug, and a screw bolt inserted through a through hole in the first lug and threaded into a screw hole in the second lug and screwed up with a nut to fix the tube clamp to the workpiece. According to a second embodiment of the present invention, the second lug is detachably selectively fastened to longitudinally spaced hook holes in the second end of the binding strap by a hook joint.

DETAILED DESCRIPTION OF THE PREFERRED EMBODIMENT

Figure 1:
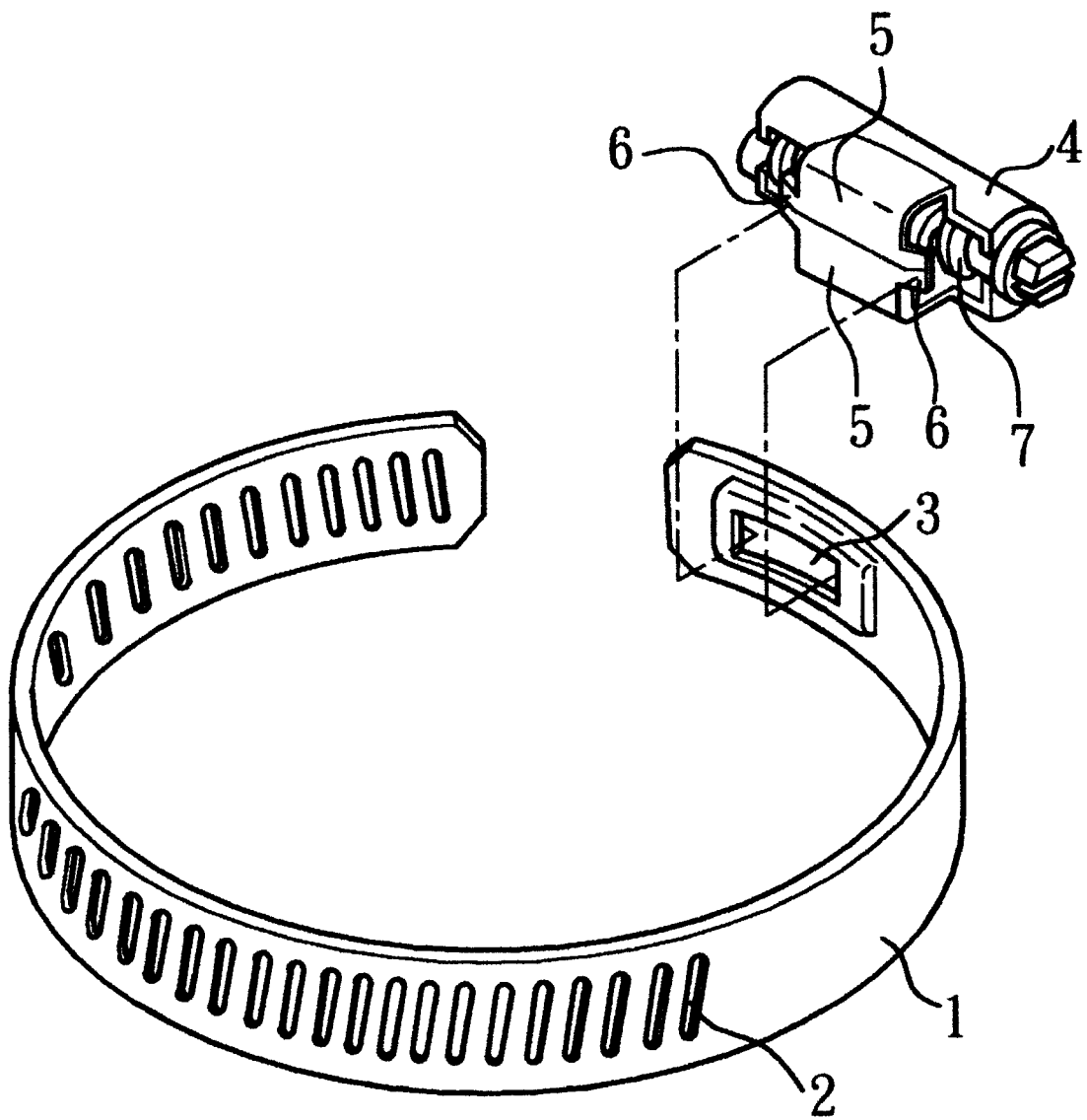
FIG. 1 is an exploded view of a tube clamp constructed according to the prior art.
Figure 2A:
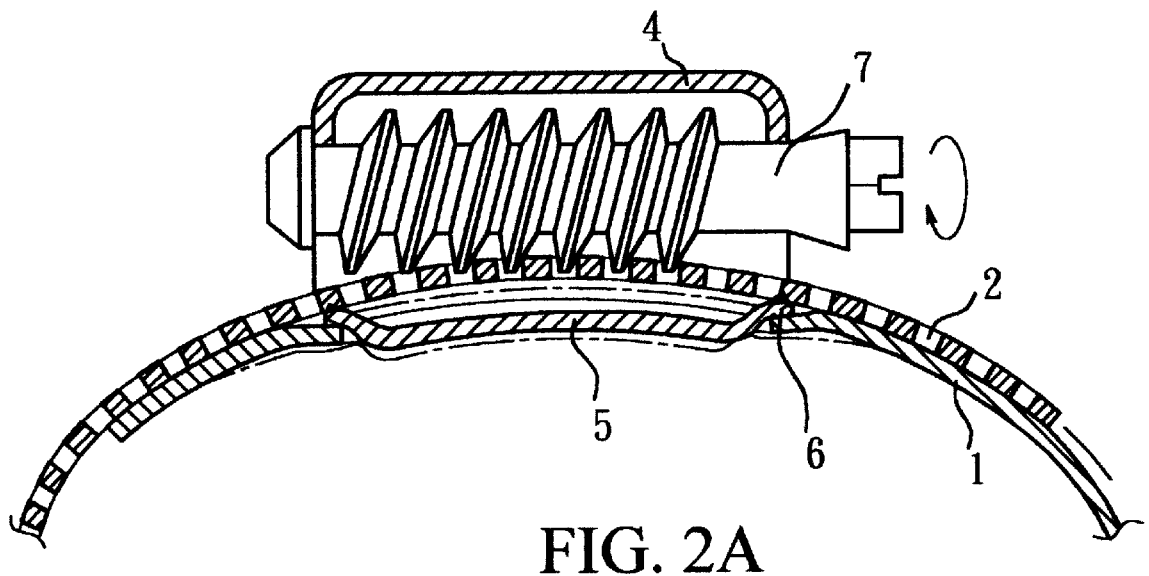
FIG. 2A is a sectional assembly view in an enlarged scale of the tube clamp shown on FIG. 1.
Figure 2B:
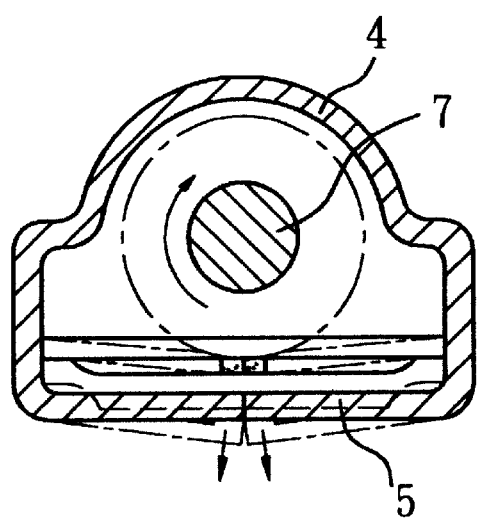
FIG. 2B is a schematic drawing showing breakdown of the metal clamping plates of the binding strap of the tube clamp shown on FIG. 1.
Figure 3:
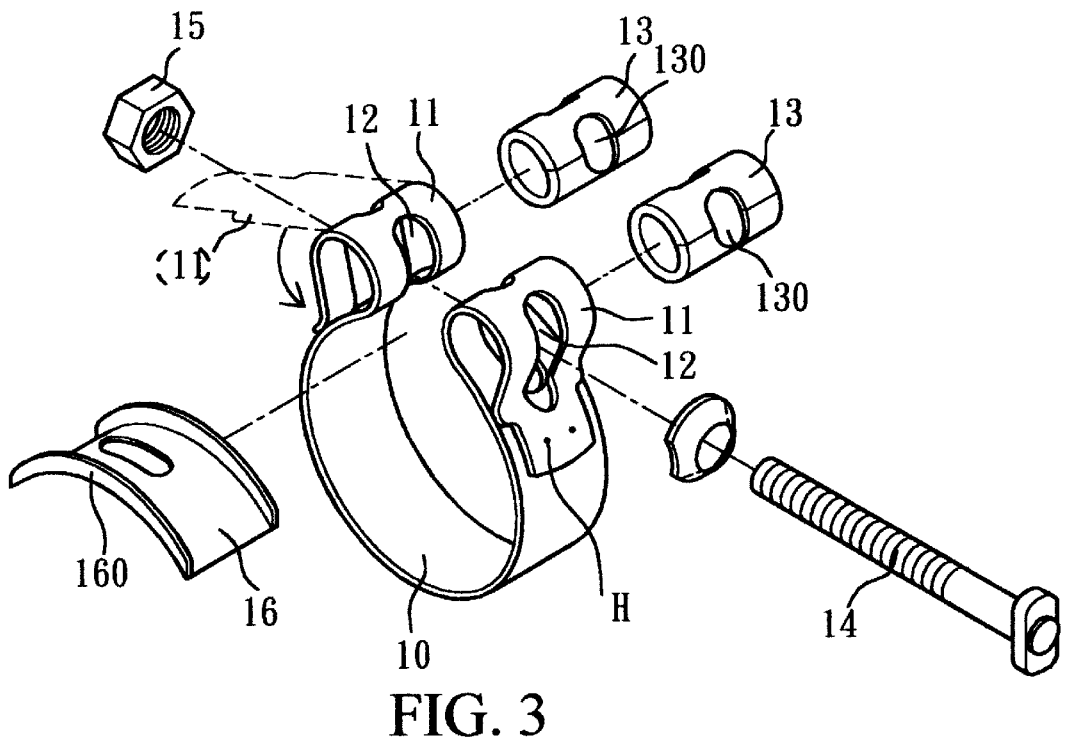
FIG. 3 is an exploded view of another structure of tube clamp constructed according to the prior art.
Figure 4:
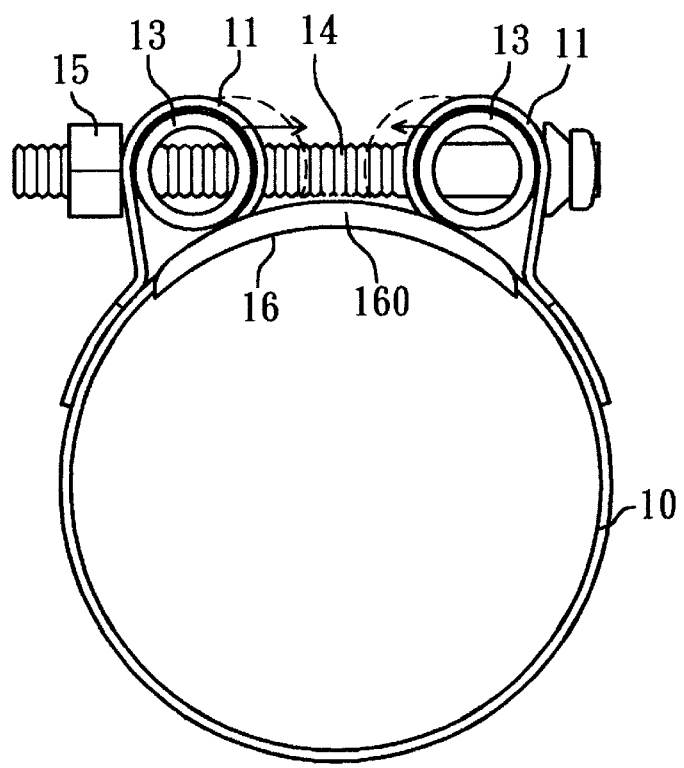
FIG. 4 is a sectional assembly view of the tube clamp shown on FIG. 3.
Figure 5A:
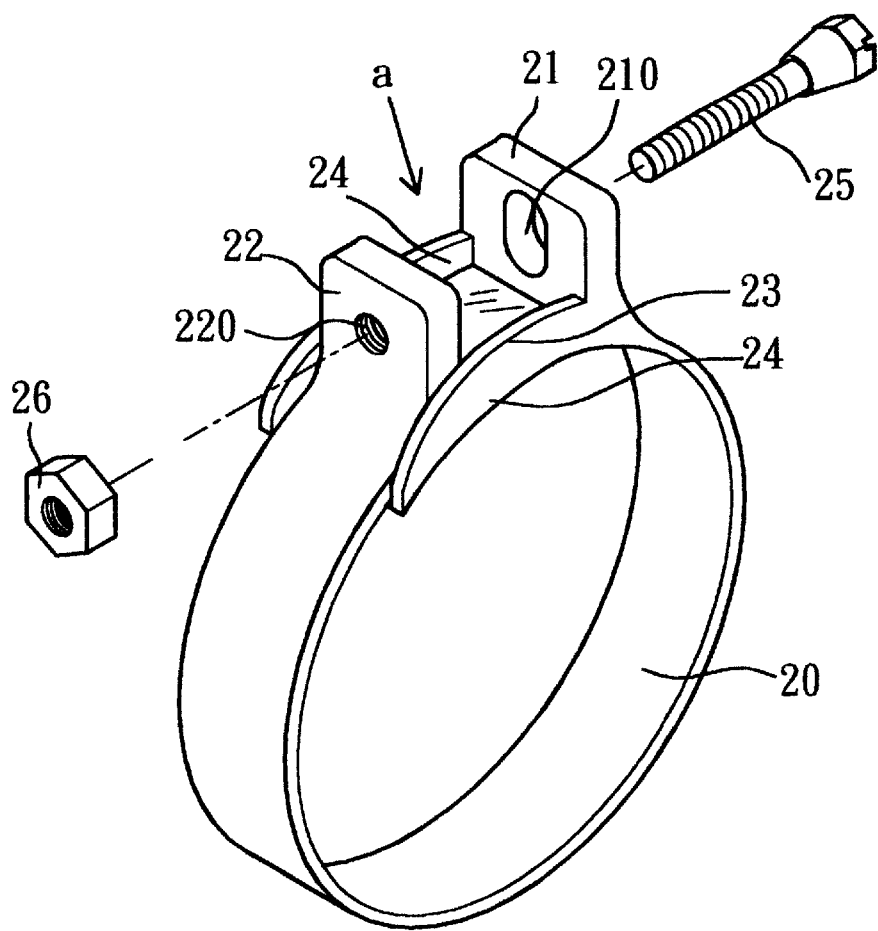
FIG. 5A is an exploded view of a tube clamp constructed according to one embodiment of the present invention.
Figure 5B:
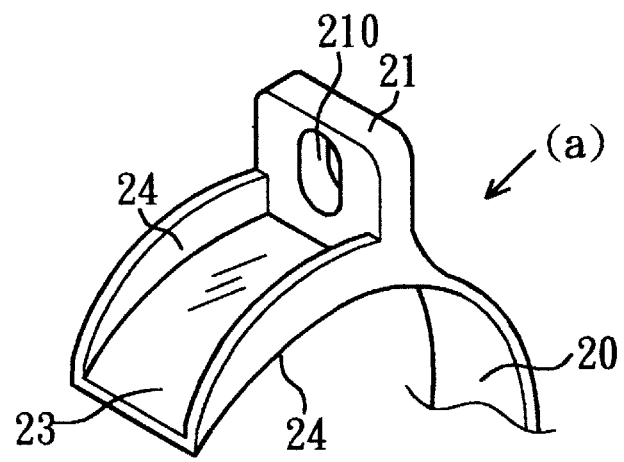
FIG. 5B is a perspective view of part "a" of the tube clamp shown on FIG. 5A.

Referring to FIGS. 5 and 5A, a tube clamp in accordance with one embodiment of the present invention is shown comprised of a binding strap 20, a screw bolt 25, and a nut 26. The binding strap 20 is injection-molded from high strength plastics, comprising a first lug 21 substantially perpendicularly extended from the first end thereof, a through hole 210 extended through front and back sides of the first lug 21, a second lug 22 substantially perpendicularly extended from the second end thereof, a screw hole 220 extended through front and back sides of the second lug 22, a smoothly arched extension bearing flange 23 forwardly extended from the root of the first leg 21 and adapted for supporting the second lug 22, and two reinforcing ribs 24 perpendicularly extended along two sides of the smoothly arched extension bearing flange 23 and adapted to guide movement of the second lug 22 with the second end of the binding strap 20 on the extension bearing flange 23 toward the first lug 21.

Figure 6A:
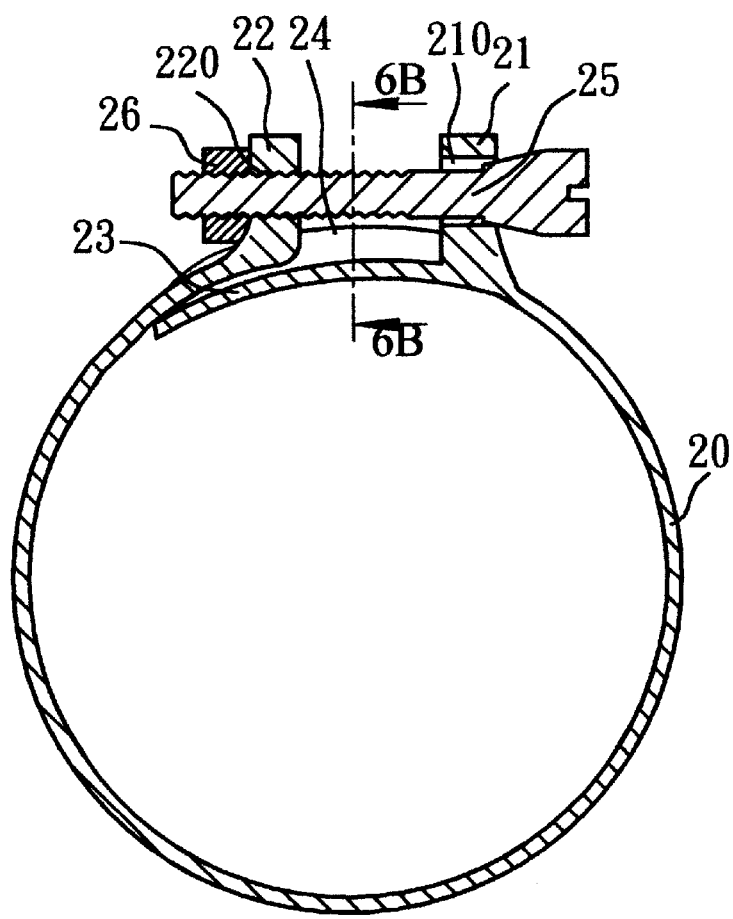
FIG. 6A is a sectional assembly view of the tube clamp shown on FIG. 5A.
Figure 6B:
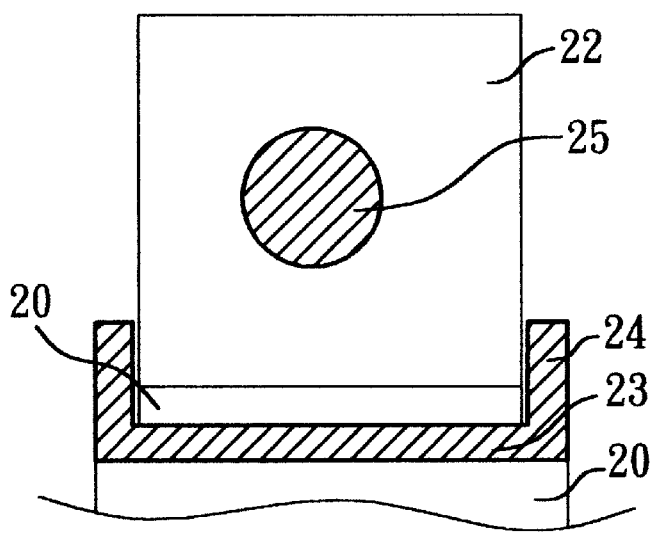
FIG. 6B is a sectional view taken along line A—A of FIG. 6A.

Referring to FIGS. 6A and 6B and FIG. 5 again, during installation, the binding strap 20 is attached to the workpiece (not shown), and then the screw bolt 25 is inserted through the through hole 210 of the first lug 21 and threaded into the screw hole 220 of the second lug 22, and then the nut 26 is threaded onto the screw bolt 25 to fasten up the tube clamp.

As indicated above, the binding strap 20 is injection-molded from high strength plastics. Because the binding strap 20 is injection-molded from high strength plastics, it is rustless, easy and inexpensive to manufacture. During installation, the plastic binding strap 20 fits the periphery of the workpiece perfectly. Furthermore, the reinforcing ribs 24 reinforces the structural strength of the binding strap 20, and guides the second lug 22 toward the first lug 21 smoothly during installation of the tube clamp.

Figure 7:
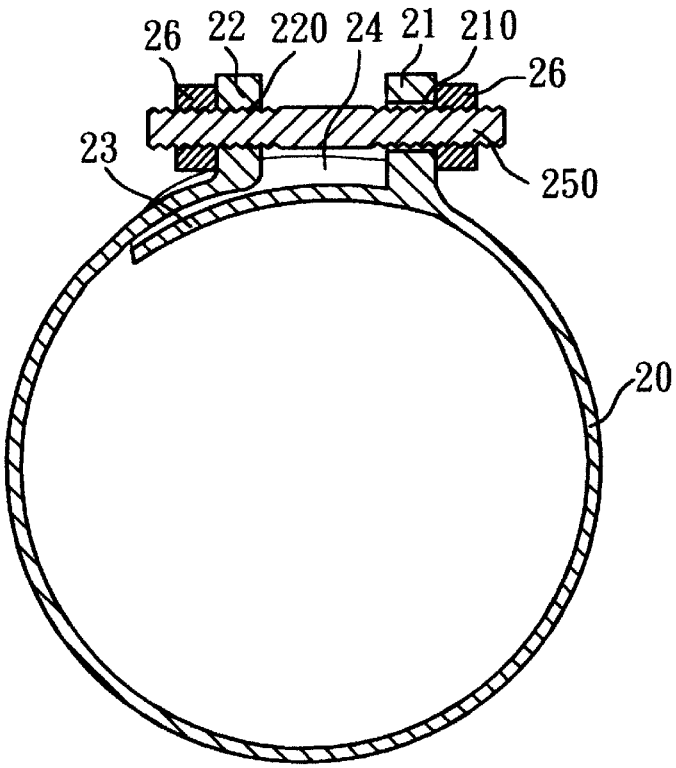
FIG. 7 is a sectional view of an alternate form of the present invention, showing two nuts mounted on the screw bolt.

FIG. 7 shows an alternate form of the tube clamp according to the present invention. According to this embodiment, a screw rod 250 is used instead of the aforesaid screw bolt 25, and two nuts 26 are respectively threaded onto the screw rod 250 and stopped at the first lug 21 and the second lug 22 at two opposite sides.

Figure 8:
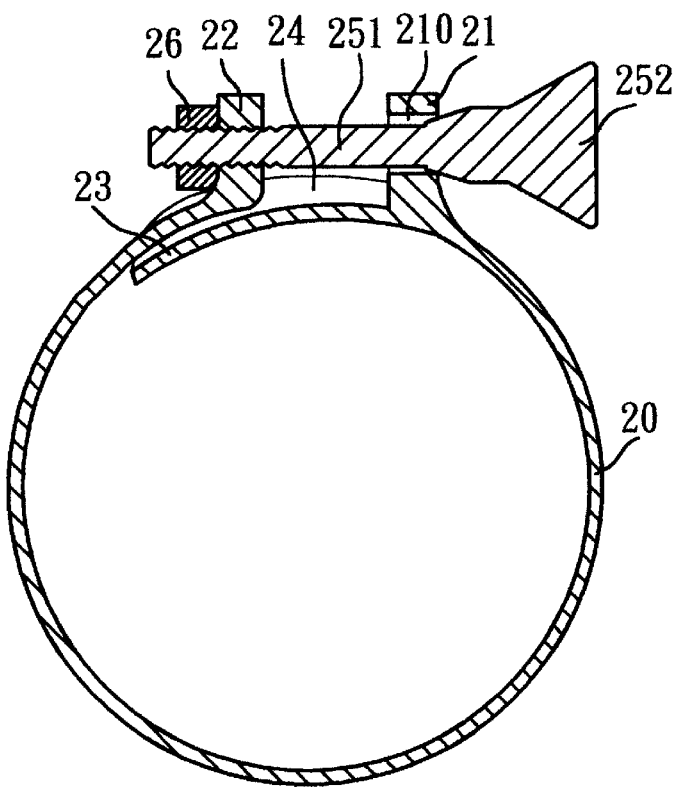
FIG. 8 is a sectional view of another alternate form of the present invention, showing a different design of the screw bolt.

FIG. 8 shows another alternate form of the tube clamp according to the present invention. According to this embodiment, the screw bolt, referenced by 251, has a handle 252 at its one end through which the screw bolt 251 can conveniently be fastened up with the hands without a tool.

Figure 9A:
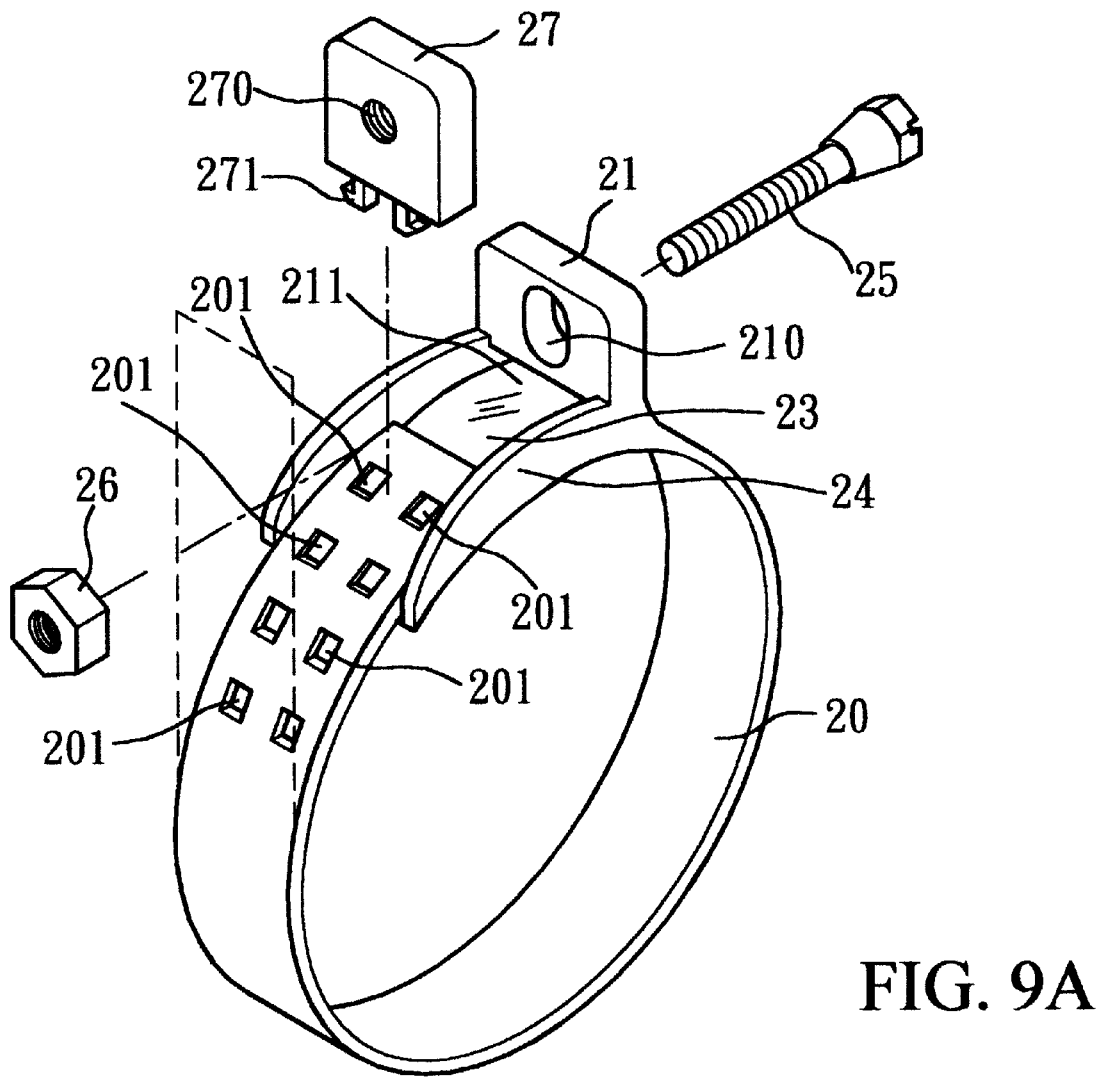
FIG. 9A is an exploded view of still another alternate form of the tube clamp according to the present invention.
Figure 9B:
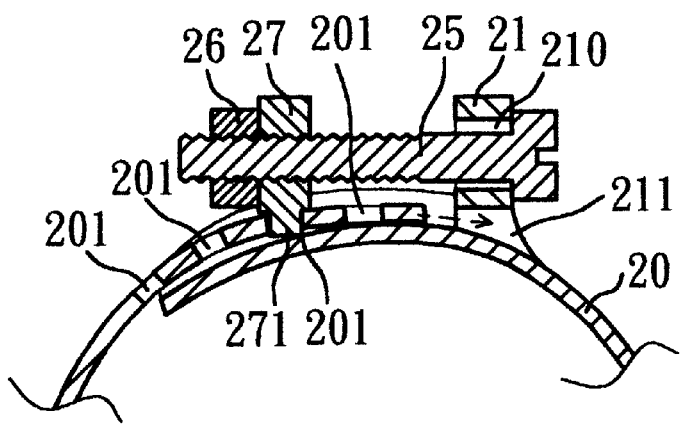
FIG. 9B is a sectional assembly view of the tube clamp shown on FIG. 9A.

FIGS. 9A and 9B show still another alternate form of the tube clamp according to the present invention. According to this embodiment, the tube clamp is comprised of a binding strap 20 injection-molded from high strength plastics, a screw bolt 25, and a nut 26. The binding strap 20 comprises a first lug 21 substantially perpendicularly extended from the first end thereof, a through hole 210 extended through front and back sides of the first lug 21, and a second lug 27 detachably fastened to the second end thereof. The second end of the binding strap 20 has two longitudinal rows of hook holes 201. The second lug 27 has a screw hole 270 through the front and back sides thereof, and two bottom hooks 271 selectively hooked in the hook holes 201. When in use, the binding strap 20 is attached to the workpiece (not shown), and then the second lug 27 is selectively fastened to the hook holes 201, and then the screw bolt 25 is inserted through the through hole 210 of the first lug 21 and threaded into the screw hole 270 of the second lug 27, and then the nut 26 is threaded onto the screw bolt 25 to fasten tight the tube clamp.

A prototype of tube clamp has been constructed with the features of FIGS. 5~9. The tube clamp functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A tube clamp comprising:
    a binding strap adapted for attaching to the connection area of two tubular members being inserted one into the other,
    a screw bolt mounted in said binding strap, and a nut threaded onto said screw bolt to adjustably fasten tight said binding strap in an overlapping looped configuration,
    wherein said binding strap is injection-molded from high strength plastics, said binding strap having a first end and a second end portions, said binding strap including:
        a first lug integrally formed at said first end portion to project therefrom, said first lug having formed therein a through hole engaging said screw bolt, and
        a second lug disposed to project from said second end portion, said second lug having formed therein a screw hole for engaging said screw bolt in axially displaceable manner, said second lug being adjustably displaceable relative to said first lug responsive to axial advancement of said screw bolt relative thereto,
        a smoothly arched extension bearing flange integrally formed to extend from at least one of said first and second lugs for supportingly guiding the displacement of said first and second end portions of said binding strap one relative to the other, a pair of reinforcing ribs extending peripherally along two side edges of said smoothly arched extension bearing flange.

2. The tube clamp as claimed in claim 1, wherein said second end portion of said binding strap has formed therein a plurality of longitudinally spaced hook holes; said second lug being detachably fastened to said second end portion of said binding strap, said second lug having at least one bottom hook releasably engaging at least one of said hook holes in said second end portion of said binding strap.

* * * * *